L. Rundell,
Hay Fork.
No. 38129.  Patented April 7, 1863.
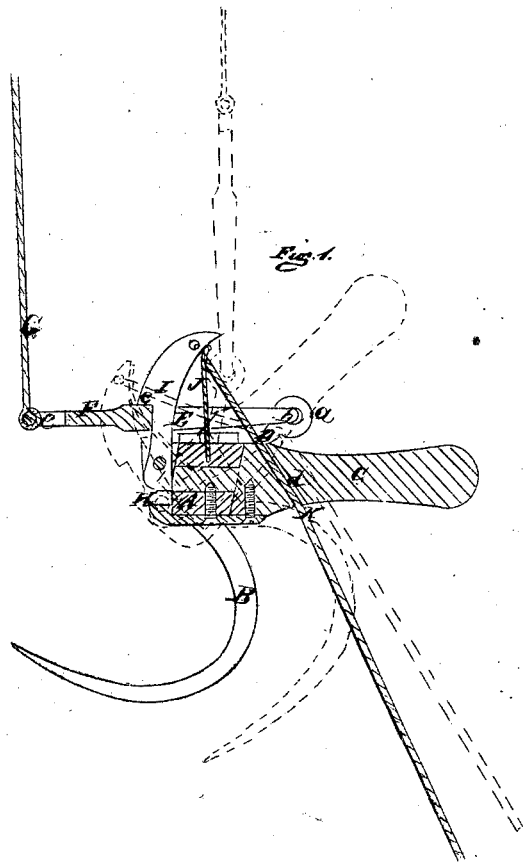
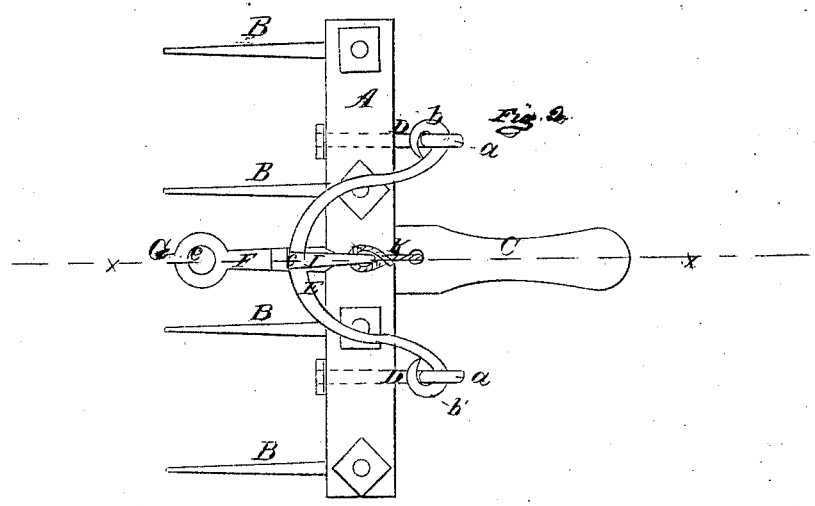

UNITED STATES PATENT OFFICE.

L. RUNDELL, OF COXSACKIE, NEW YORK.

IMPROVEMENT IN HAY-ELEVATING FORKS.

Specification forming part of Letters Patent No. 38,129, dated April 7, 1863.

*To all whom it may concern:*

Be it known that I, L. RUNDELL, of Coxsackie, in the county of Greene and State of New York, have invented a new and Improved Hay-Elevating or Horse Hay Fork; and I do hereby declare that the following is a full, clear, and exact description of the same, reference being had to the accompanying drawings, making a part of this specification, in which—

Figure 1 is a side view of my invention; Fig. 2, a plan or top view of the same.

Similar letters of reference indicate corresponding parts in the two figures.

This invention relates to an improved fork for elevating hay or grain or straw and depositing the same in mows, and which are commonly termed "horse hay-forks," in consequence of being hoisted by means of a horse.

The invention consists in the combination of a bail and spring-catch, arranged in relation to each other and to the fork in the manner hereinafter described, so that the latter will be retained in a proper position while being hoisted and the load securely held by the fork, while the latter may at the proper time, or at the will of the operator, be tilted or freed from the bail, so as to admit of the ready discharge of the load from the fork. The several parts also by their arrangement form a very compact device, and one not liable in being hoisted to be brought in contact with the beams or internal fixtures of a barn, nor the parts liable to get out of repair or become deranged by use.

To enable those skilled in the art to fully understand and construct my invention, I will proceed to describe it.

A represents a bar or beam, which forms the head of the fork, and to which the teeth B are secured in any proper way. These teeth are of metal, of curved form, as shown in Fig. 1, and are placed at equal distances apart. Four teeth will be most generally used; but more or less may be employed. The fork in itself, is substantially the same as others used for the same purpose.

To the head A of the fork, at about its center, there is secured at right angles a handle, C, and in the head A there are fitted two short rods, D D, one at each side of the handle and at equal distances from it. These rods D D are bent at one end, so as to form eyes $a$, into which the ends $b\,b$ of a bail, E, are fitted loosely. The eyes $a\,a$ are a short distance out from the head A, and the bail E is so curved or of such dimensions that it will, when turned down in contact with the head, extend a trifle beyond the side of the head opposite to the side from which the handle C projects. (See both figures.) The bail is provided at its center with an arm, F, having an eye, $c$, at its outer end, to which the hoisting-rope G is attached.

To the side of the head A, opposite to the side where the handle C is attached, there is secured a metal socket, H, in which a catch, I, is pivoted. This catch is formed of a curved bar, the convex side of which is notched or cut so as to form a shoulder, $c$, which will fit over the center of the bail at its inner side when the bail is turned down parallel with the upper surface of the head A. (See Fig. 1.) This shoulder $c$ is forced over the bail by a spring, J, attached to the head A.

To the upper end of the catch I there is attached a cord or rope, K, which passes down through a hole, $d$, in the handle C.

The operation is as follows: The hoisting-rope G passes over a pulley in the upper part of the barn, and extends down and passes underneath a pulley on the barn-floor, the horse being attached to the end of the rope that passes underneath the latter-mentioned pulley, the opposite end of the rope being attached to the arm F of the bail E. The fork is thrust into the hay by the attendant, who grasps the handle C for that purpose, and the bail E is then turned down, so that the spring J will force the shoulder $c$ of the catch I over the bail and hold the latter parallel with the upper surface of the head A, as shown clearly in Fig. 1. The horse is then started and the fork ascends with its load until the latter is over the spot where it is to be deposited. The horse is then checked or stopped and the attendant pulls the rope or cord K, and thereby draws the catch I back and free from the bail E, so that the fork will be tilted under the weight of the load, (see red outline, Fig. 1,) and the latter therefore discharged. The fork is then lowered by backing the horse, the former again thrust into the hay, the bail E turned down to be caught and held by the catch I, and the horse again started and the succeeding load elevated and discharged as before.

By this arrangement it will be seen that a very compact device is obtained, as the bail E during the hoisting of the fork is down parallel with the upper surface of the head, and consequently will admit of the fork being elevated higher than if it were in a vertical position, as the bail will not in my arrengement come so soon in contact with beams, rafters, or girders.

Another advantage of the arrangement consists in the tendency of the pull of the hoisting-rope to keep the teeth B of the fork up or elevated, so that they may firmly retain or hold their load, not being liable to tilt, and thereby to drop a portion of said load. This is an important feature. This invention also admits of a strong and durable implement being made at a moderate cost.

I do not claim a bail and catch or fastening applied to a hay-elevating fork irrespective of the combination and arrangement herein shown and described; but,

Having thus described my invention, what I do claim as new, and desire to secure by Letters Patent, is—

The combination of the bail E, arm F or its equivalent, and the catch I, when arranged relatively with each other, and the fork or the head A thereof, to operate as and for the purpose herein set forth.

L. RUNDELL.

Witnesses:
IRA W. PALMER,
EDWARD B. KING.